US011520991B2

(12) United States Patent
Sun et al.

(10) Patent No.: US 11,520,991 B2
(45) Date of Patent: Dec. 6, 2022

(54) METHOD, APPARATUS, ELECTRONIC DEVICE AND STORAGE MEDIUM FOR PROCESSING A SEMANTIC REPRESENTATION MODEL

(71) Applicant: BEIJING BAIDU NETCOM SCIENCE AND TECHNOLOGY CO., LTD., Beijing (CN)

(72) Inventors: Yu Sun, Beijing (CN); Haifeng Wang, Beijing (CN); Shuohuan Wang, Beijing (CN); Yukun Li, Beijing (CN); Shikun Feng, Beijing (CN); Hao Tian, Beijing (CN); Hua Wu, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 232 days.

(21) Appl. No.: 16/885,358

(22) Filed: May 28, 2020

(65) Prior Publication Data
US 2021/0182498 A1 Jun. 17, 2021

(30) Foreign Application Priority Data
Dec. 12, 2019 (CN) .......................... 201911270428.7

(51) Int. Cl.
*G06F 40/30* (2020.01)
*G06F 40/40* (2020.01)

(52) U.S. Cl.
CPC .............. *G06F 40/30* (2020.01); *G06F 40/40* (2020.01)

(58) Field of Classification Search
None
See application file for complete search history.

(56) References Cited

U.S. PATENT DOCUMENTS

2017/0011289 A1* 1/2017 Gao ...................... G06F 40/268
2017/0278510 A1 9/2017 Zhao et al.
(Continued)

FOREIGN PATENT DOCUMENTS

CN 104915448 A 9/2015
CN 106776581 A 5/2017
(Continued)

OTHER PUBLICATIONS

Ryan Kiros et al. "Skip-Thought Vectors" Advances in Neural Information Processing Systems 28 (NIPS 2015) (Year: 2015).*
(Continued)

*Primary Examiner* — Richemond Dorvil
*Assistant Examiner* — Alexander G Marlow
(74) *Attorney, Agent, or Firm* — Brooks Kushman P.C.

(57) ABSTRACT

The present disclosure provides a method, apparatus, electronic device and storage medium for processing a semantic representation model, and relates to the field of artificial intelligence technologies. A specific implementation solution is: collecting a training corpus set including a plurality of training corpuses; training the semantic representation model using the training corpus set based on at least one of lexicon, grammar and semantics. In the present disclosure, by building the unsupervised or weakly-supervised training task at three different levels, namely, lexicon, grammar and semantics, the semantic representation model is enabled to learn knowledge at levels of lexicon, grammar and semantics from massive data, enhance the capability of universal semantic representation and improve the processing effect of the NLP task.

6 Claims, 5 Drawing Sheets

(56) References Cited

U.S. PATENT DOCUMENTS

| | | | |
|---|---|---|---|
| 2020/0159827 A1* | 5/2020 | Vozila | H04L 51/04 |
| 2021/0004485 A1* | 1/2021 | Summers | G06F 40/284 |
| 2021/0056169 A1* | 2/2021 | Bahirwani | G06F 40/295 |
| 2021/0149993 A1* | 5/2021 | Torres | G06V 10/40 |
| 2022/0198136 A1* | 6/2022 | Peleg | G06F 40/40 |

FOREIGN PATENT DOCUMENTS

| | | |
|---|---|---|
| CN | 108614855 A | 10/2018 |
| CN | 110197279 A | 9/2019 |
| CN | 110309267 A | 10/2019 |
| CN | 110377905 A | 10/2019 |
| CN | 110427627 A | 11/2019 |
| KR | 20190040825 A | 4/2019 |
| WO | 2017007740 A1 | 1/2017 |

OTHER PUBLICATIONS

B. Nguyen et al., "Fast and Accurate Capitalization and Punctuation for Automatic Speech Recognition Using Transformerand Chunk Merging," 2019 22nd Conference of the Oriental COCOSDA , doi: 10.1109/O-COCOSDA46868.2019.9041202. (Year: 2019).*

C. Spiccia, A. Augello, G. Pilato and G. Vassallo, "A word prediction methodology for automatic sentence completion," Proceedings of the 2015 IEEE 9th International Conference on Semantic Computing (IEEE ICSC 2015), 2015, pp. 240-243, doi: 10.1109/ICOSC. 2015.7050813. (Year: 2015).*

Christoph Alt, Marc Hubner, Leonhard Hennig, "Improving Relation Extraction by Pre-trained Language Representations". arXiv:1906. 03088v1 (Year: 2019).*

Delvin et al. "BERT: Pre-training of Deep Bidirectional Transformers for Language Understanding" arXiv:1810.04805 (Year: 2019).*

Conneau et al. "Supervised Learning of Universal Sentence Representations from Natural Language Inference Data" arXiv: 1705. 02364 (Year: 2018).*

Chinese Office Action dated Feb. 7, 2020, for related Chinese Appln. No. 201911270428.7; 3 Pages.

Chinese Search Report dated Dec. 27, 2019 for related Chinese Appln. No. 201911270428.7; 3 Pages.

Chinese Notice of Allowance Chinese dated Mar. 23, 2020 for related Chinese Appln. No. 201911270428.7; 1 Page.

"Ernie: Enhanced Representation through Knowledge Integration" by Yu Sun, ShuohuanWang, Yukun Li, Shikun Feng Xuyi Chen, Han Zhang, Xin Tian, Danxi; arXiv 1904.09223v1 [cs.CL] Apr. 19, 2019; 8 Pages.

"Ernie 2.0: A Continual Pre-Training Framework for Language Understanding" by Yu Sun, Shuohuan Wang, Yukun Li, Shikun Feng, Hao Tian, Hua Wu, Haifeng Wang; arXiv:1907.12412v1 [cs.CL] Jul. 29, 2019; 11 Pages.

Notice of Allowance of Korean application No. 10-2020-0068058, dated Dec. 30, 2021, 4 pages.

Extended European Search Report dated Oct. 20, 2020, for related European Appln. No. 20176601.1; 9 Pages.

Hiroki et al., Automatic evaluation of machine translation using BERT, Tokyo Metropolitan University, Osaka University, Mar. 4, 2019, 10 pages.

Devlin et al., BERT: Pre-training of Deep Bidirectional Transformers for Language Understanding, arXiv:1810.04805v2 [cs.CL] May 24, 2019, 16 pages.

Aoshima et al., Sentiment Analysis of Japan Economic Watcher Survey Data with Japanese BERT model, The 33rd Annual Conference of the Japanese Society for Artificial Intelligence, Jun. 1, 2019, 4 pages.

* cited by examiner

哈尔滨 (Harbin)

⇧ ⇧ ⇧

Transformer

⇧ ⇧ ⇧ ⇧ ⇧ ⇧ ⇧ ⇧ ⇧  ⇧ ⇧ ⇧ ⇧ ⇧ ⇧ ⇧
X X X is the capital city of Heilongjiang Province and an international city famous for ice and snow

METHOD, APPARATUS, ELECTRONIC DEVICE AND STORAGE MEDIUM FOR PROCESSING A SEMANTIC REPRESENTATION MODEL

CROSS-REFERENCE TO RELATED APPLICATIONS

The present application claims the priority of Chinese Patent Application No. 2019112704287, filed on Dec. 12, 2019, with the title of "Method, apparatus, electronic device and storage medium for processing a semantic representation model". The disclosure of the above applications is incorporated herein by reference in its entirety.

TECHNICAL FIELD

The present disclosure relates to the field of computer technologies, specifically to artificial intelligence technologies, and particularly to a method, apparatus, electronic device and storage medium for processing a semantic representation model.

BACKGROUND

Artificial intelligence (A) is a new technological science which reaches and develops theories, methods, techniques and application systems for simulating, extending and expanding human intelligence. Artificial intelligence, as a branch of computer science, is intended to learn about essence of intelligence and creates a new intelligent machine which is capable of responding in a manner similar to human intelligence. Research in the field includes robots, language recognition, image recognition, Natural Language Processing (NLP), expert systems and so on. Particularly, the NLP field is a popular direction of AI research in recent years.

In the NLP field, a neural network model may be used to perform semantic representation of sentences and then process an NLP task based on the obtained semantic representation. In the prior art, a typical semantic representation includes a context-irrelevant semantic representation implemented with a Word2Vec or Glove model, and a context-relevant semantic representation implemented using Elmo, a Bidirectional Encoder Representations from Transformers (BERT) model, XLNET etc. The context-relevant semantic representation has an obvious improvement in effect as compared with the context-irrelevant semantic representation.

However, in current technologies such as BERT and XLNet, learning is performed mainly through co-occurrence information of words or sentences, and the target of the task is single. For example, a BERT model is trained through a mask language model and next sentence of prediction task; XLNet builds a fully-permutated language model, and performs pre-training in an autoregressive manner. As a result, it is difficult for the semantic representation models trained with the prior art technologies to sufficiently learn layers of information of the training corpus so that the conventional semantic representation models have limited capabilities and the accuracy of semantic representation is undesirable.

SUMMARY

The present disclosure provides a method, apparatus, electronic device and storage medium for processing a semantic representation model, for enriching a semantic representation capability of a semantic representation model and improving the accuracy of the semantic representation.

The present disclosure provides a method for processing a semantic representation model, comprising:

collecting a training corpus set including a plurality of training corpuses;

training the semantic representation model using the training corpus set based on at least one of lexicon, grammar and semantics.

Further optionally, in the above method, training the semantic representation model using the training corpus set based on lexicon comprises at least one of the following:

training the semantic representation model using the training corpus set based on a masking strategy of words, phrases and/or entities;

training the semantic representation model using the training corpus set to cause it to learn a capability of analyzing whether an initial letter of a word needs to be capitalized in different contexts; and training the semantic representation model using the training corpus set to cause it to learn a capability of predicting whether words in the training corpus set occur in other segments of an original document.

Further optionally, in the above method, training the semantic representation model using the training corpus set based on grammar comprises at least one of the following:

training the semantic representation model using the training corpus set to enable it to learn a capability of recognizing an order relationship of different segments of the training corpus; and training the semantic representation model using the training corpus set to enable it to learn a capability of recognizing a positional relationship of any two sentence pairs.

Further optionally, in the above method, training the semantic representation model using the training corpus set based on semantics comprises at least one of the following:

training the semantic representation model using the training corpus set to enable it to learn a capability of recognizing a logic relationship between two continuous sentences and training the semantic representation model using the training corpus set to enable it to learn a capability of recognizing correlation between a query and a webpage title in the training corpus.

Further optionally, in the above method, after training the semantic representation model using the training corpus set based on at least one of lexicon, grammar and semantics, the method further comprises:

training the semantic representation model based on a pre-collected task corpus set of natural language processing, to obtain a corresponding task model of natural language processing;

executing the task of natural language processing, based on the task model of natural language processing.

The present disclosure further provides a processing apparatus of a semantic representation model, comprising:

a collecting module configured to collect a training corpus set including a plurality of training corpuses;

a semantic representation model training module configured to train the semantic representation model using the training corpus set based on at least one of lexicon, grammar and semantics.

The present disclosure further provides an electronic device, comprising:

at least one processor; and a memory communicatively connected with the at least one processor, wherein, the memory stores instructions executable by the at least one processor, and the instructions are executed by the at least one processor to enable the at least one processor to perform the above-mentioned method.

In a further aspect, the present disclosure provides a non-transitory computer-readable storage medium storing computer instructions therein, wherein the computer instructions are used to cause the computer to perform the above-mentioned method.

An embodiment of the present disclosure has the following advantages or beneficial effects: by collecting the training corpus set including a plurality of training corpuses, and training the semantic representation model using the training corpus set based on at least one of lexicon, grammar and semantics, the trained semantic representation model can be enabled to sufficiently learn information at levels such as lexicon, grammar and semantics, the semantic representation capability of the semantic representation model is enriched, and the accuracy of the semantic representation is improved.

Furthermore, in the present disclosure, by performing the lexicon-based task training for the semantic representation model, the semantic representation model is enabled to learn co-occurrence knowledge of words, phrases and entities, understand the fusion of knowledge, and thereby enhance the sematic representation capability of the semantic representation model and accurately perform semantic representation for each sentence. Meanwhile, the semantic representation model can also learn the capability of analyzing whether initial letters of words need to be capitalized in different contexts, thereby accurately learning correct expressions of words in different contexts; in addition, the semantic representation model can further learn a capability of predicting the co-occurrence of words in other segments of the original document, thereby facilitating predicting which words in the document can characterize the central idea of the document. The above lexicon-based task training may enable the semantic representation model to learn rich lexicon knowledge, and fully understand the meaning conveyed by lexicon to help accurately perform the semantic representation.

Furthermore, in the present disclosure, by further performing the grammar-based task training for the semantic representation model, the semantic representation model is enabled to learn the sorting of sentences and recognize the positional relationship of different sentences, so that each sentence can be accurately positioned during the semantic representation, to improve the accuracy of the semantic representation.

Furthermore, in the present disclosure, by further performing the semantics-based task training for the semantic representation model, the semantic representation model is enabled to learn the logical relationship task of sentences and the query correlation task, thereby accurately understanding the semantics and enhancing the accuracy of the semantic representation upon performing the semantic representation.

In one word, in the present disclosure, by building the unsupervised or weakly-supervised training task at three different levels, namely, lexicon, grammar and semantics, the semantic representation model is enabled to learn knowledge at levels of lexicon, grammar and semantics from massive data, enhance the capability of universal semantic representation and improve the processing effect of the NLP task.

Other effects of the above aspects or possible implementations will be described hereunder in conjunction with specific embodiments.

BRIEF DESCRIPTION OF THE DRAWINGS

The figures are only used to facilitate better understanding of the technical solutions and cannot be construed as limiting the present disclosure. In the figures.

DETAILED DESCRIPTION

Exemplary embodiments of the present disclosure are described below with reference to the accompanying drawings, include various details of the embodiments of the present disclosure to facilitate understanding, and should be considered as merely exemplary. Therefore, those having ordinary skill in the art should recognize that various changes and modifications can be made to the embodiments described herein without departing from the scope and spirit of the application. Also, for the sake of clarity and conciseness, depictions of well-known functions and structures are omitted in the following description.

Figure 1:
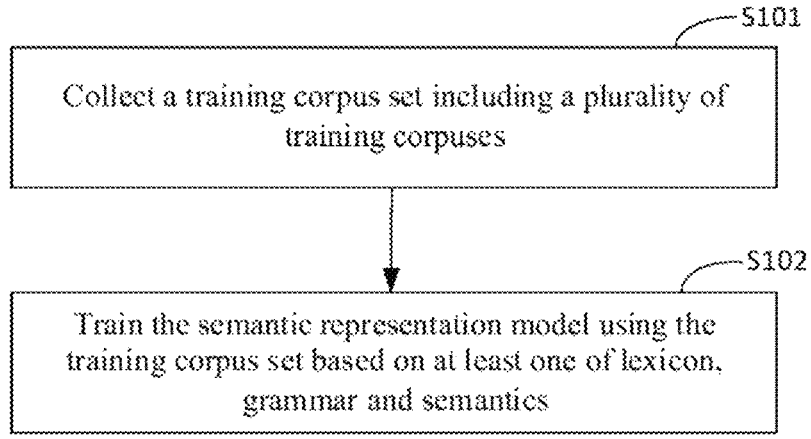
FIG. 1 is a schematic diagram of a first embodiment according to the present disclosure.

FIG. 1 is a schematic diagram of a first embodiment according to the present disclosure. As shown in FIG. 1, a flow chart of a method for processing a semantic representation model of the present disclosure is introduced in detail. As shown in FIG. 1, the method for processing the semantic representation model of the present embodiment comprises the following steps:

S101: collecting a training corpus set including a plurality of training corpuses;

S102: training the semantic representation model using the training corpus set based on at least one of lexicon, grammar and semantics.

A subject of performing the method for processing the semantic representation model according to the present embodiment is a processing apparatus of the semantic representation model. The processing apparatus of the semantic representation model may be an independent electronic entity or an application system integrated with software and can implement various processes of the semantic representation model, e.g., may implement the training of the semantic representation model.

To improve the accuracy of the trained semantic representation model, in the present embodiment the semantic representation model may be trained using a training corpus set based on one type, two types or multiple types of training tasks, for example, specifically based on at least one type of training task of lexicon, grammar and semantics.

It needs to be appreciated that when the semantic representation model is trained based on at least two types of training tasks of lexicon, grammar and semantics, the semantic representation model is trained simultaneously based on at least two types of training tasks of lexicon, grammar and semantics, or trained based on each type of training task in turn. There is no specific limitation on the order of training tasks based on which the model is trained.

To ensure the training effect of the semantic representation model, the training corpus set in the present embodiment may include millions of or even more training corpus. The data content of each piece of training corpus in the training corpus set in the present embodiment may be very rich to meet the needs of different training tasks. Alternatively, in the training corpus set of the present embodiment, it is further possible to mark an identifier of the training task to which each piece of training corpus is applied, e.g., use numbers 1, 2 and 3 to represent the training corpus needed by three types of training tasks, respectively. Specifically, in each type of training task, if the training task needs to be further subdivided into sub-tasks, if the needed training corpus is different, it is further possible to mark, in the training corpus set, identifiers of the sub-tasks to which respective training corpus are applicable.

Optionally, the training the semantic representation model using the training corpus set based on lexicon in step S102 in the present embodiment comprises at least one of the following:

(a) training the semantic representation model using the training corpus set based on a masking strategy of words, phrases and/or entities;

(b) training the semantic representation model using the training corpus set to cause it to learn a capability of analyzing whether an initial letter of a word needs to be capitalized in different contexts; and (c) training the semantic representation model using the training corpus set to cause it to learn a capability of predicting whether words in the training corpus set occur in other segments of the original document.

The above three manners (a), (b) and (c) belong to task training at a lexicon level. In practical application, when the semantic representation model is trained, it may be trained in the above three manners simultaneously, or in any of the three manners or in a combined manner of any two of the three manners. Certainly, the more the selected training manner, the stronger the learning capability of the trained semantic representation model, the more accurately the model can perform semantic representation.

Figure 2:
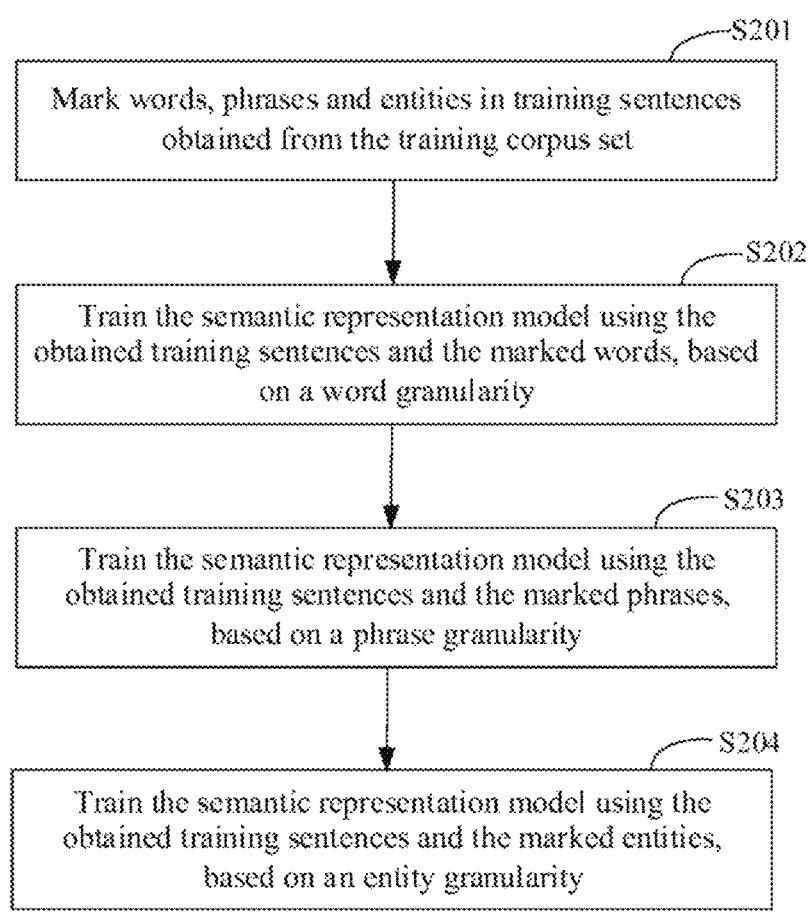
FIG. 2 is a schematic diagram of a second embodiment according to the present disclosure.

FIG. 2 is a schematic diagram of a second embodiment according to the present disclosure. FIG. 2 illustrates in detail a specific implementation of the above manner (a) in the above embodiment, namely, training the semantic representation model using the training corpus set based on a masking strategy of words, phrases and/or entities. As shown in FIG. 2, the training the semantic representation model using the training corpus set based on a masking strategy of words, phrases and/or entities may specifically comprise the following steps:

S201: marking words, phrases and entities in training sentences obtained from the training corpus set;

For example, in the present embodiment, the words, phrases and entities in training sentences obtained from the training corpus set may be marked using a pre-trained sequence marking model, where the words are minimal units of terms, phrases may be combinations of words, e.g., may include appositive phrases such as "Beijing the capital", directional phrases such as "on the ground", number phrases such as "a flower", etc.

The granularity of words or entities in the present embodiment is greater than that of characters. For example, a word is specifically formed by two or more continuous characters, e.g., "漂亮", "美丽", "真实", "高兴", "五颜六色", "省会", "城市", etc. An entity may specifically a name of a person, a place, a company or the like. The granularity of phrases is greater than that of the words and entities.

The training corpus set is pre-collected and includes a plurality of training corpuses. In the present embodiment, different training corpus might be needed in different training tasks. For example, the training corpus needed by some training tasks are some short training sentences, whereas some other training tasks need a long paragraph including a plurality of sentences. In the present embodiment, the identifier of the training task to which each piece of training corpus is applied may be marked in the training corpus set. For example, when the above manner (a) is employed to train the semantic representation model using the training corpus set based on a masking strategy of words, phrases and/or entities, training sentences applicable to the training task are obtained from the training corpus set, then the semantic representation model is trained based on the obtained training sentences and based on the masking strategy of words, phrases and/or entities.

Specifically, upon use, each training sentence may be input to the sequence marking model, and the sequence marking model may output the words, phrases and entities included in the training data. Correspondingly, when the sequence marking model is trained, several groups of training sentences and words, phrases and entities marked for each training sentence may be collected. Specifically, each piece of training data is input to the sequence marking model, the sequence marking model predicts the words, phrases and entities included therein, and then determines whether the predicted words, phrases and entities are consistent with the marked words, phrases and entities. In the case of inconsistency, parameters of the sequence marking model are adjusted based on the predicted words, phrases and entities and the marked words, phrases and entities. The sequence marking model is trained with a plurality of training sentences and corresponding marked words, phrases and entities until training times reach a preset maximum times threshold, or the parameters needn't be adjusted in continuous preset times of training. It may be believed that the training of the sequence marking model has already been completed. At this time, the parameters of the sequence marking model are determined, and thereby the sequence marking model is determined.

Alternatively, in the present embodiment, the words, phrases and entities in each training sentence in the training corpus set may be respectively marked using pre-collected word repository, phrase repository and entity repository. The word repository or phrase repository may be formed by collecting all words or phrases based on the pre-collected massive corpus repository. Likewise, in the entity repository, entities such as place names, persons' names and company names may be collected, and meanwhile a template of company names may be self-defined to mark other company entities outside the entity repository.

In practical application, the marking of words and entities may also be implemented in other manners other than the above two manner, which will not be detailed one by one here.

S202: training the semantic representation model using the obtained training sentences and the marked words, based on a word granularity;

S203: training the semantic representation model using the obtained training sentences and the marked phrases, based on a phrase granularity;

S204: training the semantic representation model using the obtained training sentences and the marked entities, based on an entity granularity.

For example, regarding the training based on a character granularity, the semantic representation model may learn the character "尔" in the middle of "哈*滨". Correspondingly, regarding the training based on the word granularity, the semantic representation model may learn a semantic relationship that "哈尔滨 (Harbin)" is the capital city of Heilongjiang Province. Regarding the training based on the phrase granularity, the semantic representation model may learn a phrase relationship about a famous cultural city. Regarding the training based on the entity granularity, the semantic representation model may learn that there is a semantic relationship between Harbin and Heilongjiang. In the present embodiment, some entities per se are a word; some entities are greater than a word and may specifically include two or more words.

Specifically, through steps S202-S204, the semantic representation model is trained respectively based on the word granularity, phrase granularity and entity granularity so that the semantic representation model can learn knowledge fusion based on words, phrase and entities in the sentences. Furthermore, the order relationship of steps S202-S204 in the present embodiment may not be limited. It is possible to first train the semantic representation model based on the word granularity, then based on the phrase granularity and entity granularity in turn respectively, or based on the entity granularity and phrase granularity in turn respectively. Alternatively, it is also possible to first train the semantic representation model based on the entity granularity, then based on the phrase granularity and word granularity in turn respectively, or based on the word granularity and phrase granularity in turn respectively; even it is also possible to train the semantic representation model simultaneously based on the three granularities, for example, it is possible to, during training, first train the semantic representation model one time or fixed times based on the phrase granularity, then train the semantic representation model one time or fixed times based on the word granularity, and then train the sematic representation model one time or fixed times based on the entity granularity; train the semantic representation model repeatedly according to the above process. In one word, it is feasible to complete the training based on the word granularity, phrase entity and entity granularity regardless of the order of training or of simultaneous training.

Figures 3, 4:
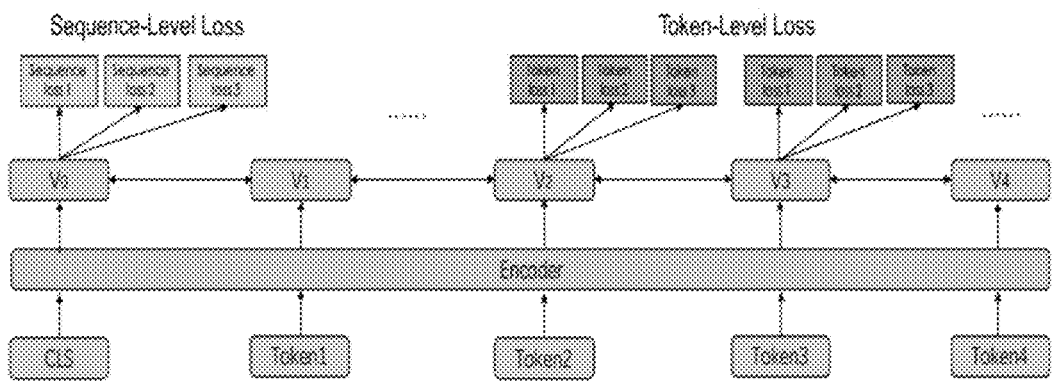
FIG. 3 is an example diagram of a training application according to the present disclosure.
FIG. 4 is an architecture diagram of multi-task learning of a semantic representation model according to the present disclosure.

During training of the semantic representation model based on the word granularity using the training sentences and marked words applicable for the training task obtained from the training corpus set, it is possible to randomly block a certain proportion of words with respect to each training sentence and marked words in the training sentence, and enable the model to predict the blocked words according to contextual information such as other words in the training sentence and thereby learn the knowledge fusion of words in the context. When the training is performed with the training sentence shown in FIG. 3 based on the word granularity, words such as "哈尔滨 (Harbin)", "黑龙江 (Heilongjiang)", "省会 (capital city)", "国际 (international)" or "冰雪 (ice and snow)" may be randomly blocked such that the semantic representation model may learn that Heilongjiang is in a province-capital city relationship with Harbin, and Harbin is a city famous for ice and snow culture. Upon specific training, a certain proportion of words are randomly blocked with respect to each training sentence, and then the semantic representation model predicts the blocked words. Determination is then made as to whether the prediction is correct, and if correct, parameters of the semantic representation model are adjusted to make the predicted words consistent with the blocked words. The semantic representation model is trained continuously using multiple training sentences and marked words, until in preset continuous times of training, the accuracy of the semantic representation model is always greater than a preset accuracy threshold, which indicates at this time that the semantic representation model learns the capacity and the training based on the word granularity ends up. The preset accuracy in the present embodiment may be set according to actual needs, e.g., 99%, 98% or other percent. Transform in FIG. 3 represents a Transform model. The semantic representation model in the present embodiment is implemented based on the Transform model.

The semantic representation model is trained based on the entity granularity using the training sentences and marked entities applicable for the training task obtained from the training corpus set. It is possible to randomly block a certain proportion of entities with respect to each training sentence and marked entities in the training sentence, and enable the model to predict the blocked entities according to contextual information such as other entities in the training sentence and thereby learn the knowledge fusion of entities in the context. When the training is performed with the training sentence shown in FIG. 3 based on the entity granularity, any entity of "哈尔滨 (Harbin)" and "黑龙江 (Heilongjiang)" may be randomly blocked such that the semantic representation model may learn that Heilongjiang is in a province-capital city relationship with Harbin. Upon specific training, a certain proportion of entities are randomly blocked with respect to each training sentence, and then the semantic representation model predicts the blocked entity. Determination is then made as to whether the prediction is correct, and if correct, the parameters of the semantic representation model are adjusted to make the predicted entity consistent with the blocked entity. The semantic representation model is trained continuously using multiple training sentences and marked entity, until in preset continuous times of training, the accuracy of the semantic representation model is always greater than a preset accuracy threshold, which indicates at this time that the semantic representation model learns the capacity and the training based on the entity granularity ends up. Likewise, the preset accuracy in the present embodiment may be set according to actual needs, e.g., 99%, 98% or other percent.

The implementation principle of training based on the phrase entity in the present embodiment is the same as that of the training based on the word granularity. Reference may be made to relevant depictions of the above embodiments, and no detailed depictions will be presented here any longer.

Since the semantic representation model of the present embodiment is trained based on the word granularity, the phrase granularity and entity granularity, the semantic representation capability of the semantic representation model can be enhanced. Hence, the semantic representation model in the present embodiment may also be referred to an Enhanced Representation through kNowledge IntEgration (ERNIE) model. The ERNIE model of the present embodiment is also implemented based on the Transformer model.

Alter the semantic representation model of the present embodiment is trained based on the word granularity, the phrase granularity and entity granularity, the semantic representation model can learn knowledge fusion between characters in the context, knowledge fusion between words and knowledge fusion between entities, so that the semantic representation capability of the semantic representation model can be enhanced, and each sentence can be accurately semantically represented. Furthermore, the semantic representation model trained in the present embodiment has a greater universality and extensibility and may be applied to process any NLP task.

Furthermore, the above manner (b) in the above embodiment shown in FIG. 1, namely, training the semantic representation model using the training corpus set to cause it to learn a capability of analyzing whether an initial letter of a word needs to be capitalized in different contexts, will be discussed below.

For example, the capability may be applicable to a language environment such as English language. In different contextual scenarios, some initial letters need to be capitalized, and some needn't be capitalized. For example, in English language, an initial letter at the beginning of a complete sentence may be capitalized, and an initial letter of a word following a comma which indicates that the sentence is not yet complete needn't be capitalized. Again for example, in some contexts, when some word as brand names or persons' names such as Apple and Harry Potter occur, their initial letters need to be capitalized. In practical application, there are many more contexts in which initial letters of words need to be capitalized or needn't be capitalized. In the present embodiment, the semantic representation model is trained capable of automatically recognizing in which contexts initial letters of words need to be capitalized or needn't be capitalized.

Likewise, first, respective training corpus applicable for the training task need to be obtained from the training corpus set, and the training corpus includes training corpus in which initial letters of words need to be capitalized and training corpus in which initial letters of words needn't be capitalized. However, the training corpus cannot only include words, and they further need to include a context of words, e.g., include a sentence preceding the word. Upon training, the training corpus is inputted to the semantic representation model, the semantic representation model predicts initial letters of which words need to be capitalized or needn't be capitalized, and then compares the predicted spelling with known correct spelling. In the case of inconsistency, the parameters of the semantic representation model are adjusted to make the predicted speeding consistent with the known spelling. The obtained respective training corpus are used to continuously train the capability of the semantic representation model in the above manner, until the prediction accuracy of the semantic representation model reaches a preset accuracy threshold, e.g., 99%, 98% or other percent, which at this time indicates that the semantic representation model has learnt the capability, and the training of the task ends.

Furthermore, the above manner (c) in the above embodiment, namely, training the semantic representation model using the training corpus set to cause it to team a capability of predicting whether words in the training corpus set occur in other segments of the original document. The capability can enable the semantic representation model to predict which words can represent a central idea of the article.

Likewise, first, respective training corpus applicable for the training task need to be obtained from the training corpus set, and the training corpus of the task may be sentences, and meanwhile, an identifier about whether each word in the training corpus has ever occurred in other segments of the original document may be marked. Upon training, the training corpus is input into the semantic representation model, and the semantic representation model predicts and outputs whether each word in the training corpus has ever occurred in other segments of the original document. Then, determination is made as to whether the prediction of the semantic representation model is correct, based on the already-marked identifier about whether each word in the training corpus has ever occurred in other segments of the original document. In the case of incorrectness, the parameters of the semantic representation model are adjusted to cause the predicted to tend to be consistent with the marked. The respective training corpus of the training task are used to continuously train the semantic representation model in the above manner, until the prediction accuracy of the semantic representation model reaches a preset accuracy threshold, e.g., 99%, 98% or other percent, which at this time indicates that the semantic representation model has learnt the capability, and the training of the task ends.

The training in the above manners (a), (b) and (c) is unsupervised task training.

The above manners (a), (b) and (c) are several implementations of training the semantic representation model using the training corpus set based on lexicon as stated in the above step S102. In practical application, the semantic representation model may be trained in other similar manners based on lexicon, and no detailed description will be presented any longer herein.

Further optionally, training the semantic representation model using the training corpus set based on grammar in step S102 in the embodiment shown in FIG. 1 comprises at least one of the following:

(A) training the semantic representation model using the training corpus set to enable it to learn a capability of recognizing an order relationship of different segments of the training corpus; and (B) training the semantic representation model using the training corpus set to enable it to learn a capability of recognizing a positional relationship of any two sentence pairs.

The manner (A) and (B) of the present embodiment belong to task training at a grammatical level. The relationship between sentences is considered in grammar of the present embodiment, so the training corpus of the training task of this time includes at least two sentences. Upon training, any two sentences therein are taken as objects to perform training.

Likewise, all training corpuses needed by the training task of this time need to be obtained from the training corpus set. The training corpus of the training task of this time may be a paragraph or a segment including a plurality of sentences. First, the training corpus needs to be segmented into a plurality of segments, the order of the segments is shuffled, and then any two segments are obtained therefrom, and the order relationship of the two segments is marked according to the training corpus for subsequent training. For example, when the semantic representation model is trained to learn the capability of recognizing the order relationship of different segments of the training corpus, two segments obtained based on the training corpus may be input into the semantic representation model, and the semantic representation model predicts and outputs the order relationship of the two segments, namely, which segment is before which segment. Then, determination is made as to whether the predicted order relationship is consistent with the known order relationship based on the known order relationship of the two segments. In the case of inconsistency, the parameters of the semantic representation model are adjusted to make the predicted order relationship tend to be consistent with the known order relationship. The respective training corpuses of this training task are used to continuously train the semantic representation model in the above manner, until the prediction accuracy of the semantic representation model reaches a preset accuracy threshold, e.g., 99%, 98% or other percent, which at this time indicates that the semantic representation model has learnt the capability, and the training of the task ends. Through the training of the task, the semantic representation model may be enabled to learn a capability of recognizing the order and cause-effect relationship between segments and thereby accurately recognizing the order relationship of different segments. The training task may also be referred to as a sorting task of sentences.

In the present embodiment, when the semantic representation model is trained to learn the capability of recognizing the positional relationship of any two sentence pairs, three classification tasks may be set, and determination is made as to whether the positional relationship between the sentences pairs is of the following three classes: adjacent sentences, non-adjacent sentences in the document, and sentences in different documents. Certainly, in practical application, more classes may be set according to needs so that the semantic representation model can better use the article information to learn the semantic correlation.

Likewise, all training corpuses needed by the training task of this time need to be obtained from the training corpus set. The training corpus of the training task of this time may be a sentence pair. To enrich the training corpus, the training corpus of the present embodiment may take two adjacent sentences from the same document, or take two non-adjacent sentences in the same document or take two sentences in different documents. Various different training corpuses may be pre-collected according to a predetermined proportion, and marking is made on whether the positional relationship of two sentences is two adjacent sentences from the same document, or two non-adjacent sentences in the same document or two sentences in different documents. Upon training, the two sentences in the training corpus of the task are input into the semantic representation model, and the semantic representation model predicts and outputs the positional relationship of the two sentences, and then compares the predicted positional relationship with the known positional relationship to see whether they are consistent. In the case of inconsistency, the parameters of the semantic representation model are adjusted to make the predicted positional relationship tend to be consistent with the known positional relationship. The respective training corpuses of this training task are used to continuously train the semantic representation model in the above manner, until the prediction accuracy of the semantic representation model reaches a preset accuracy threshold, e.g., 99%, 98% or other percent, which at this time indicates that the semantic representation model has learnt the capability, and the training of the task ends.

The above manners (A) and (B) are unsupervised training.

The above manners (A) and (B) are several implementations of training the semantic representation model using the training corpus set based on grammar as stated in the above step S102. In practical application, the semantic representation model may be trained in other similar manners based on grammar, and no detailed description will be presented any longer herein.

Further optionally, training the semantic representation model using the training corpus set based on semantics in step S102 in the embodiment shown in FIG. 1 comprises at least one of the following:

(1) training the semantic representation model using the training corpus set to enable it to learn a capability of recognizing a logic relationship between two continuous sentences; and (2) training the semantic representation model using the training corpus set to enable it to learn a capability of recognizing correlation between a query and a webpage title in the training corpus.

The manners (1) and (2) of the present embodiment belong to task training at a semantic level. The logical relationship task of sentences and the query correlation task are respectively learnt based on semantic analysis of sentences.

For example, when the capability of recognizing the logical relationship between two continuous sentences is learnt, whether the two sentences are connected by a conjunction such as "though", "if", "but" and "and" may be learnt, so that the logical relationship between the two sentences is clarified.

Likewise, first, all training corpuses needed by the training task of this time need to be obtained from the training corpus set. The training corpus of the training task may be two sentences which are collected from the original documents and connected by a conjunction such as "though", "if", "but" and "and". Certainly, two sentences not connected by a conjunction may also be collected as negative examples of training samples. Upon training, the two sentences in the training corpus are input to the semantic representation model, and the semantic representation model predicts and outputs a logic relationship of the two sentences, e.g., different identifiers may be used to respectively identify the logical relationship such as "though", "if", "but" and "and". Then, determination is made as to whether the predicted logical relationship is consistent with the known logical relationship. In the case of inconsistency, the parameters of the semantic representation model are adjusted to make the predicted logical relationship tend to be consistent with the known logical relationship. The respective training corpuses of this training task are used to continuously train the semantic representation model in the above manner, until the prediction accuracy of the semantic representation model reaches a preset accuracy threshold, e.g., 99%, 98% or other percent, which at this time indicates that the semantic representation model has learnt the capability, and the training of the task ends.

For example, learning a capability of recognizing correlation between a query and a webpage title in the training corpus may mean learning classes of the relationship between the query and the title. For example, if class 0 indicates a strong correlation, it may be believed at this time that the user clicks the title after querying. Class 1 indicates a weak correlation, and it may be believed at this time that the user displays but does not click the title after querying. Class 2 indicates uncorrelation, and it may be believed at this time that the user does not display the title after querying.

Likewise, first, all training corpuses needed by the training task of this time need to be obtained from the training corpus set. The training corpuses of the training task may be obtained from a search log. Specifically, the Query of each time of search and each title obtained from each search may be obtained. Then, the queries and titles of the searches may be randomly combined to constitute the training corpuses of the training task. Meanwhile, the relationship between the query and the title, namely, strong correlation, weak correlation or uncorrelation, is marked in the training task. Upon training, the query and title in the training corpus are input to the semantic representation model, and the semantic representation model predicts and outputs the relationship between the query and the title. Then, determination is made as to whether the predicted relationship is consistent with the known relationship. In the case of inconsistency, the parameters of the semantic representation model are adjusted to make the predicted relationship tend to be consistent with the known relationship. The respective training corpuses of this training task are used to continuously train the semantic representation model in the above manner, until the prediction accuracy of the semantic representation model reaches a preset accuracy threshold, e.g., 99%, 98% or other percent, which at this time indicates that the semantic representation model has learnt the capability, and the training of the task ends.

The above manner (1) is unsupervised training, and the above manner (2) is weakly-supervised training.

The above manners (1) and (2) are several implementations of training the semantic representation model using the training corpus set based on semantics as stated in the above step S102. In practical application, the semantic representation model may be trained in other similar manners based on semantics and no detailed description will be presented any longer herein.

In the present embodiment, to ensure that the semantic representation model can learn sufficiently rich capabilities, the number of training corpuses corresponding to a task in the training corpus set must be large enough with respect to the learning of each capability, e.g., the number may be over the order of million to ensure the learning effect of the semantic representation model.

Figure 5:
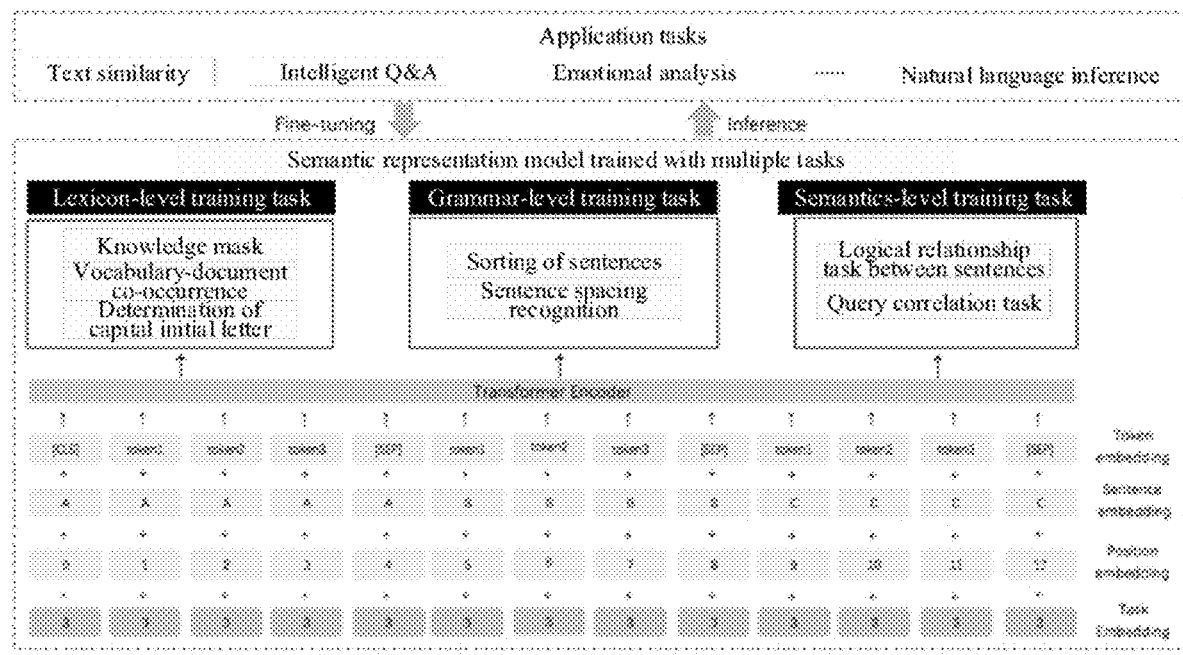
FIG. 5 is a schematic diagram of an application architecture of a semantic representation model according to the present disclosure.

It needs to be appreciated that the semantic representation model of the present embodiment uses Transformer as an Encoder structure of a bottom layer. Token Embedding, Positional Embedding and Sentence Embedding may be input to the bottom layer. Unlike other semantic representation models, Task Embedding is also introduced into the semantic representation model of the present embodiment to finely model different tasks. Different training tasks are represented using IDs ranging from 0 to N. As such, after each training corpus is input, the type of the trained task to which the training corpus is applied may be determined according to the task ID corresponding to the training corpus. Upon training, a batch of training corpuses may be random input to achieve simultaneous training of multiple tasks, quicken the training speed of the semantic representation model and improve the training effect of the semantic representation model. FIG. 4 is an architecture diagram of multi-task learning of a semantic representation model according to the present disclosure. FIG. 5 is a schematic diagram of an application architecture of a semantic representation model according to the present disclosure.

As shown in FIG. 4 and FIG. 5, when the semantic representation model of the present embodiment is trained, a special [CLS] is used as an input special starting identification to model the whole semantics. When segments of a plurality of training corpuses are input upon training, [SEP] is used to separate, and Sentence Embedding is represented with different ids. A contextual correlation representation of a top layer is obtained by calculating through a multi-layer Attention mechanism of the Transformer. Regarding the loss at the whole level of the sequence, several classifiers are added to the top layer of the [CLS]. Regarding the task at the token level, several token-level classification tasks are added to each token in the sequence. In the embodiment shown in FIG. 4, an example is taken in which the loss functions at two levels are both calculated in three different manners. In practical application, one, two or more manners of calculating the loss function may be pre-defined. Then, a final loss function at each level is obtained by calculating with a preset mathematic formula based on the loss function corresponding to each calculating manner. To facilitate understanding, it may be understood that the token is a segment of a sentence. Specifically, the token may be a character, word, phrase or entity and may vary with the training task. When the token has a corresponding training task, there is a corresponding loss function at this time. If there is no task, there is not a corresponding loss function. FIG. 4 takes an example in which four tokens are included. In practical application, the number of tokens varies with the length of the sentence and is not limited herein.

As shown in FIG. 5, the first layer shows scenarios of application tasks of the semantic representation model. A multi-task training architecture of the semantic representation model is presented below. When the semantic representation model is simultaneously trained using multiple tasks, multiple training corpuses may be input simultaneously, and each training corpus may be a sentence. As shown in FIG. 5, upon training, it is further necessary to input the task embedding of the level of the task for which the training corpus is applicable, position embedding of each token and corresponding sentence embedding. As shown in FIG. 5, an example is taken in which three sentences A, B and C are input simultaneously, all for training of the task with a task level 3. When the token embedding is input, the CLS is taken as a starting input, and different segments of the training corpus are separated with SEP. Each training corpus may be input in multiple token segments. In the embodiment of FIG. 5, the training corpus is exemplarily divided into three segments. In practical application, the division varies with the length of the training corpus and the segmentation of the training task, and is not limited herein. After all information is input, training is performed in the training manners of respective tasks of the above embodiment, and a duly-trained semantic representation model is finally obtained.

The semantic representation model trained using the above embodiment of the present disclosure is a universal semantic representation model. Since the semantic representation model, by learning the abovementioned capabilities, can learn the contextual knowledge fusion as well as various lexical, grammatical and semantic knowledge, thereby more accurately representing semantics.

Further optionally, after step S102, namely, training the semantic representation model using the training corpus set based on at least one of lexicon, grammar and semantics in the above embodiment, the method may further include application of the semantic representation model. Specifically, the semantic representation model is trained based on a pre-collected task corpus set of Natural Language Processing (NLP), to obtain a corresponding NLP task model; the NLP task is executed based on the NLP task model.

The semantic representation model obtained through the training and leaning of the above various tasks according to the present embodiment is a universal semantic representation model. The data amount needed upon training is very large, for example, the data amount needed in the learning of each task may be over the order of million. The semantic representation model obtained through the above training cannot be directly used to process the NLP task. Before use, the semantic representation model may be first trained using the task corpus set of the NLP, to obtain a corresponding NLP-based task model to process the corresponding NLP task. That is, the NLP task corpus set in the present embodiment is used to train the universal semantic representation model and train it into a corresponding NLP task model. The task corpus set is only a small-scale task set as compared with the training corpus set for training the universal semantic representation model. The training corpus set is only used to train the semantic representation capability of the semantic representation model and is by no means relevant to the task. However, the task corpus set is used to train a task-related capability, not to train the semantic representation capability. Since the universal semantic representation model obtained in the present embodiment already can perform semantic representation very accurately, upon use, the semantic representation model may be trained with the small-scale task set only into the corresponding task model.

As shown in FIG. 5, the semantic representation model after the above training is trained with the corresponding task set, to respectively implement the processing of tasks such as text similarity, intelligent question and answer, emotional analysis and natural language inference, which will not be described one by one in detail.

According to the method for processing the semantic representation model of the present embodiment, by collecting the training corpus set including a plurality of training corpuses, and training the semantic representation model using the training corpus set based on at least one of lexicon, grammar and semantics, the trained semantic representation model can be enabled to sufficiently learn information at levels such as lexicon, grammar and semantics, the semantic representation capability of the semantic representation model is enriched, and the accuracy of the semantic representation is improved.

Furthermore, in the present embodiment, by performing the lexicon-based task training for the semantic representation model, the semantic representation model is enabled to learn co-occurrence knowledge of words, phrases and entities, understand the fusion of knowledge, and thereby enhance the sematic representation capability of the semantic representation model and accurately perform semantic representation for each sentence. Meanwhile, the semantic representation model can also learn the capability of analyzing whether initial letters of words in different contexts need to be capitalized, thereby accurately learning correct expressions of words in different contexts; in addition, the semantic representation model can further learn a capability of predicting the co-occurrence of words in other segments of the original document, thereby facilitating predicting which words in the document can characterize the central idea of the document. The above lexicon-based task training may enable the semantic representation model to learn rich lexicon knowledge, and fully understand the meaning conveyed by lexicon to help accurately perform the semantic representation.

Furthermore, in the present embodiment, by further performing the grammar-based task training for the semantic representation model, the semantic representation model is enabled to learn the sorting of sentences and recognize the positional relationship of different sentences, so that each sentence can be accurately positioned during the semantic representation, to improve the accuracy of the semantic representation.

Furthermore, in the present embodiment, by further performing the semantics-based task training for the semantic representation model, the semantic representation model is enabled to learn the logical relationship task of sentences and the query correlation task, thereby accurately understanding the semantics and enhancing the accuracy of the semantic representation upon performing the semantic representation.

In one word, in the present embodiment, by building the unsupervised or weakly-supervised training task at three different levels, namely, lexicon, grammar and semantics, the semantic representation model is enabled to learn knowledge at levels of lexicon, grammar and semantics from massive data, enhance the capability of universal semantic representation and improve the processing effect of the NLP task.

Figure 6:
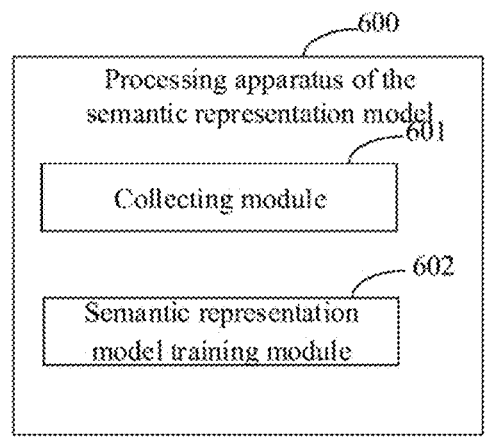
FIG. 6 is a schematic diagram of a third embodiment according to the present disclosure.

FIG. 6 is a schematic diagram of a third embodiment according to the present disclosure. FIG. 6 illustrates a structure of a processing apparatus 600 of the semantic representation model of the present embodiment. As shown in FIG. 6, the processing apparatus 600 of the semantic representation model of the present embodiment comprises:

a collecting module 601 configured to collect a training corpus set including a plurality of training corpuses;

a semantic representation model training module 602 configured to train the semantic representation model using the training corpus set collected by the collecting module 601 based on at least one of lexicon, grammar and semantics.

Figure 7:
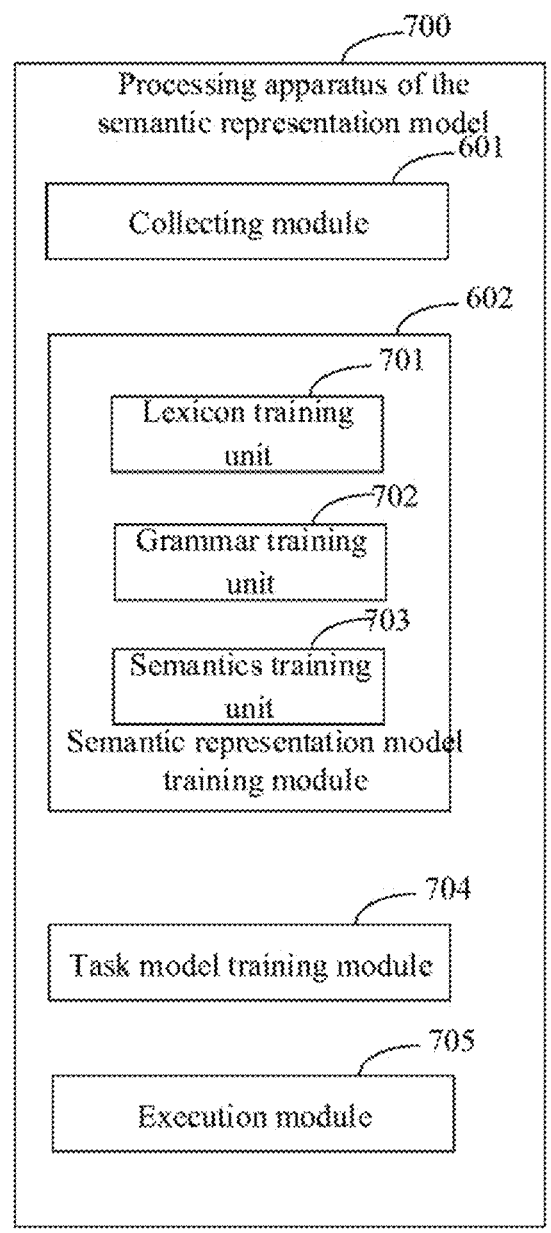
FIG. 7 is a schematic diagram of a fourth embodiment according to the present disclosure.

FIG. 7 is a schematic diagram of a fourth embodiment according to the present disclosure. The processing apparatus 700 of the semantic representation model shown in FIG. 7, on the basis of the embodiment shown in FIG. 6, takes an example in which the semantic representation model training module 602 includes: a lexicon training unit 701, a grammar training unit 702 and a semantics training unit 703.

For example, the lexicon training unit 701 is configured to perform at least one of the following:

training the semantic representation model using the training corpus set collected by the collecting module 601 based on a masking strategy of words, phrases and/or entities;

training the semantic representation model using the training corpus set collected by the collecting module 601 to cause it to learn a capability of analyzing whether an initial letter of a word needs to be capitalized in different contexts; and training the semantic representation model using the training corpus set collected by the collecting module 601 to cause it to learn a capability of predicting whether words in the training corpus set occur in other segments of the original document.

For example, the grammar training unit 702 is configured to perform at least one of the following:

training the semantic representation model using the training corpus set collected by the collecting module 601 to enable it to learn a capability of recognizing an order relationship of different segments of the training corpus; and training the semantic representation model using the training corpus set collected by the collecting module 601 to enable it to learn a capability of recognizing a positional relationship of any two sentence pairs.

For example, the semantics training unit 703 is configured to perform at least one of the following:

training the semantic representation model using the training corpus set collected by the collecting module 601 to enable it to learn a capability of recognizing a logic relationship between two continuous sentences; and training the semantic representation model using the training corpus set collected by the collecting module 601 to enable it to learn a capability of recognizing correlation between a query and a webpage title in the training corpus.

Further optionally, as shown in FIG. 7, the processing apparatus 700 of the semantic representation model of the present embodiment further comprises:

a task model training module 704 configured to train the semantic representation model trained by the semantic representation model training module 602, based on a pre-collected task corpus set of natural language processing, to obtain a corresponding task model of natural language processing;

an execution model 705 configured to execute the task of natural language processing, based on the task model of natural language processing trained by the task model training module 704.

The processing apparatus of the above semantic representation model of the present embodiment implements the processing of the semantic representation model with the above modules, and its implementation principle and technical effect are identical with the above method embodiments. For particulars, please refer to the disclosure of the above relevant method embodiments, and no detailed depictions are presented here any longer.

According to an embodiment of the present disclosure, the present disclosure further provides an electronic device and a readable storage medium.

Figure 8:
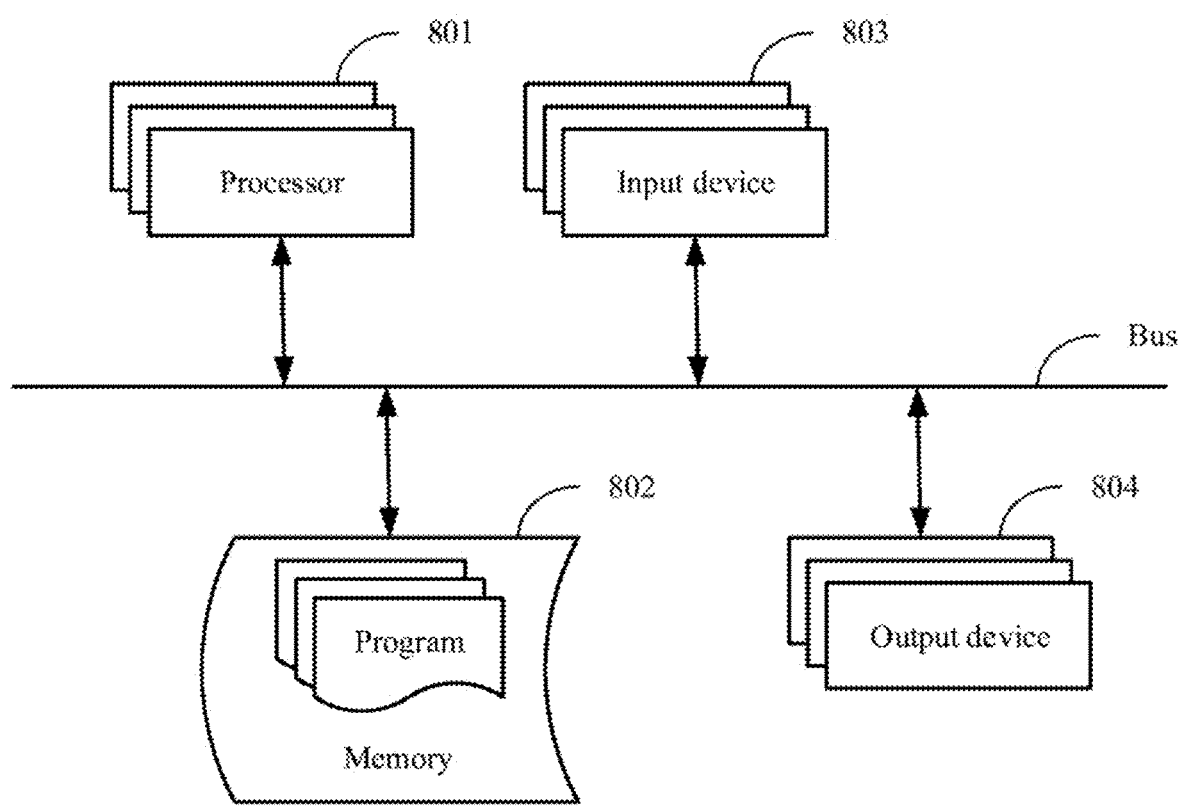
FIG. 8 is a block diagram of an electronic device for implementing a method for processing the semantic representation model according to an embodiment of the present disclosure.

As shown in FIG. 8, it shows a schematic diagram of an electronic device for implementing the method for processing the semantic representation model according to an embodiment of the present disclosure. The electronic device is intended to represent various forms of digital computers, such as laptops, desktops, workstations, personal digital assistants, servers, blade servers, mainframes, and other appropriate computers. The electronic device is further intended to represent various forms of mobile devices, such as personal digital assistants, cellular telephones, smartphones, wearable devices and other similar computing devices. The components shown here, their connections and relationships, and their functions, are meant to be exemplary only, and are not meant to limit implementations of the inventions described and/or claimed in the text here.

As shown in FIG. 8, the electronic device comprises: one or more processors 801, a memory 802, and interfaces connected to components and including a high-speed interface and a low speed interface. Each of the components are interconnected using various busses, and may be mounted on a common motherboard or in other manners as appropriate. The processor can process instructions for execution within the electronic device, including instructions stored in the memory or on the storage device to display graphical information for a GUI on an external input/output device, such as display coupled to the interface. In other implementations, multiple processors and/or multiple buses may be used, as appropriate, along with multiple memories and types of memory. Also, multiple electronic devices may be connected, with each device providing portions of the necessary operations (e.g., as a server bank, a group of blade servers, or a multi-processor system). One processor 801 is taken as an example in FIG. 8.

The memory 802 is a non-transitory computer-readable storage medium provided by the present disclosure. Wherein, the memory stores instructions executable by at least one processor, so that the at least one processor executes the method for processing the semantic representation model provided in the present disclosure. The non-transitory computer-readable storage medium of the present disclosure stores computer instructions, which are used to cause a computer to execute the method for processing the semantic representation model provided by the present disclosure.

The memory 802 is a non-transitory computer-readable storage medium and can be used to store non-transitory software programs, non-transitory computer executable programs and modules, such as program instructions/units corresponding to the method for processing the semantic representation model in the embodiments of the present disclosure (for example, the collecting module 601 and the semantic representation model training module 602 as shown in FIG. 6). The processor 801 executes various functional applications and data processing of the server, i.e., implements the method for processing the semantic representation model stated in the above method embodiments, by running the non-transitory software programs, instructions and modules stored in the memory 802.

The memory 802 may include a storage program region and a storage data region, wherein the storage program region may store an operating system and an application program needed by at least one function; the storage data region may store data created according to the use of the electronic device for implementing the method for processing the semantic representation method according to the embodiments of the present disclosure. In addition, the memory 802 may include a high-speed random access memory, and may also include a non-transitory memory, such as at least one magnetic disk storage device, a flash memory device, or other non-transitory solid-state storage device. In some embodiments, the memory 802 may optionally include a memory remotely arranged relative to the processor 801, and these remote memories may be connected to the electronic device for implementing the method for processing the semantic representation model according to embodiments of the present disclosure through a network. Examples of the above network include, but are not limited to, the Internet, an intranet, a local area network, a mobile communication network, and combinations thereof.

The electronic device for implementing the method for processing the semantic representation model may further include an input device 803 and an output device 804. The processor 801, the memory 802, the input device 803 and the output device 804 may be connected through a bus or in other manners. In FIG. 8, the connection through the bus is taken as an example.

The input device 803 may receive inputted numeric or character information and generate key signal inputs related to user settings and function control of the electronic device for the method for processing the semantic representation model and may be an input device such as a touch screen, keypad, mouse, trackpad, touchpad, pointing stick, one or more mouse buttons, trackball and joystick. The output device 304 may include a display device, an auxiliary lighting device (e.g., an LED), a haptic feedback device (for example, a vibration motor), etc. The display device may include but not limited to a Liquid Crystal Display (LCD), a Light Emitting Diode (LED) display, and a plasma display. In some embodiments, the display device may be a touch screen.

Various implementations of the systems and techniques described here may be realized in digital electronic circuitry, integrated circuitry, specially designed ASICs (Application Specific Integrated Circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" and "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

According technical solutions of embodiments of the present disclosure, by collecting the training corpus set including a plurality of training corpuses, and training the semantic representation model using the training corpus set based on at least one of lexicon, grammar and semantics, the trained semantic representation model can be enabled to sufficiently learn information at levels such as lexicon, grammar and semantics, the semantic representation capability of the semantic representation model is enriched, and the accuracy of the semantic representation is improved.

Furthermore, in the present embodiment, by performing the lexicon-based task training for the semantic representation model, the semantic representation model is enabled to learn co-occurrence knowledge of words, phrases and entities, understand the fusion of knowledge, and thereby enhance the sematic representation capability of the semantic representation model and accurately perform semantic representation for each sentence. Meanwhile, the semantic representation model can also learn the capability of analyzing whether initial letters of words need to be capitalized in different contexts, thereby accurately learning correct expressions of words in different contexts; in addition, the semantic representation model can further learn a capability of predicting the co-occurrence of words in other segments of the original document, thereby facilitating predicting which words in the document can characterize the central idea of the document. The above lexicon-based task training may enable the semantic representation model to learn rich lexicon knowledge, and fully understand the meaning conveyed by lexicon to help accurately perform the semantic representation.

Furthermore, in the present embodiment, by further performing the grammar-based task training for the semantic representation model, the semantic representation model is enabled to learn the sorting of sentences and recognize the positional relationship of different sentences, so that each sentence can be accurately positioned during the semantic representation, to improve the accuracy of the semantic representation.

Furthermore, in the present embodiment, by further performing the semantics-based task training for the semantic representation model, the semantic representation model is enabled to learn the logical relationship task of sentences and the query correlation task, thereby accurately understanding the semantics and enhancing the accuracy of the semantic representation upon performing the semantic representation.

In one word, in the present embodiment, by building the unsupervised or weakly-supervised training task at three different levels, namely, lexicon, grammar and semantics, the semantic representation model is enabled to learn knowledge at levels of lexicon, grammar and semantics from massive data, enhance the capability of universal semantic representation and improve the processing effect of the NLP task.

It should be understood that the various forms of processes shown above can be used to reorder, add, or delete steps. For example, the steps described in the present disclosure can be performed in parallel, sequentially, or in different orders as long as the desired results of the technical solutions disclosed in the present disclosure can be achieved, which is not limited herein.

The foregoing specific implementations do not constitute a limitation on the protection scope of the present disclosure. It should be understood by those skilled in the art that various modifications, combinations, sub-combinations and substitutions can be made according to design requirements and other factors. Any modification, equivalent replacement and improvement made within the spirit and principle of the present disclosure shall be included in the protection scope of the present disclosure.

What is claimed is:

1. A computer-implemented method for processing a semantic representation model, the semantic representation model comprising a transformer as an encoder structure of a bottom layer, and a token embedding, a positional embedding, a sentence embedding and a task embedding being input to the bottom layer, wherein the task embedding is used to finely model different tasks, wherein the method comprises the following steps:
    collecting a training corpus set including a plurality of training corpuses; and training the semantic representation model using the
training corpus set based on lexicon, grammar and
semantics,
wherein the training the semantic representation model
using the training corpus set based on lexicon comprises:
training the semantic representation model using the
training corpus set based on a masking strategy of
words, phrases and/or entities, comprising:
marking words, phrases and entities in training sentences
obtained from the training corpus set;
training the semantic representation model using the
obtained training sentences and the marked words,
based on a word granularity;
training the semantic representation model using the
obtained training sentences and the marked phrases,
based on a phrase granularity; and
training the semantic representation model using the
obtained training sentences and the marked entities,
based on an entity granularity,
wherein the word granularity and entity granularity are
greater than a character granularity and the phrase
granularity is greater than the word granularity and the
entity granularity;
training the semantic representation model using the
training corpus set to cause it to learn a capability of
analyzing whether an initial letter of a word needs to be
capitalized in different contexts; and
training the semantic representation model using the
training corpus set to cause it to learn a capability of
predicting whether words in the training corpus set
occur in other segments of an original document,
wherein the training the semantic representation model
using the training corpus set based on grammar comprises at least one of the following:
training the semantic representation model using the
training corpus set to enable it to learn a capability of
recognizing an order relationship of different segments
of the training corpus; and
training the semantic representation model using the
training corpus set to enable it to learn a capability of
recognizing a positional relationship of any two sentence pairs,
wherein the training the semantic representation model
using the training corpus set based on semantics comprises at least one of the following:
training the semantic representation model using the
training corpus set to enable it to learn a capability of
recognizing a logic relationship between two continuous sentences; and
training the semantic representation model using the
training corpus set to enable it to learn a capability of
recognizing correlation between a query and a webpage
title in the training corpus.

2. The method according to claim 1, wherein after training
the semantic representation model using the training corpus
set based on at least one of lexicon, grammar and semantics,
the method further comprises:
training the semantic representation model based on a
pre-collected task corpus set of natural language processing, to obtain a corresponding task model of natural
language processing; and
executing the task of natural language processing, based
on the task model of natural language processing.

3. An electronic device, comprising
at least one processor; and
a memory communicatively connected with the at least
one processor;
wherein the memory stores instructions executable by the
at least one processor, and the instructions are executed
by the at least one processor to enable the at least one
processor to perform a method for processing a semantic representation model, the semantic representation
model comprising a transformer as an encoder structure
of a bottom layer, and a token embedding, a positional
embedding, a sentence embedding and a task embedding being input to the bottom layer, wherein the task
embedding is used to finely model different tasks,
wherein the method comprises the following steps:
collecting a training corpus set including a plurality of
training corpuses; and
training the semantic representation model using the
training corpus set based on lexicon, grammar and
semantics,
wherein the training the semantic representation model
using the training corpus set based on lexicon comprises:
training the semantic representation model using the
training corpus set based on a masking strategy of
words, phrases and/or entities, comprising:
marking words, phrases and entities in training sentences
obtained from the training corpus set;
training the semantic representation model using the
obtained training sentences and the marked words,
based on a word granularity;
training the semantic representation model using the
obtained training sentences and the marked phrases,
based on a phrase granularity; and
training the semantic representation model using the
obtained training sentences and the marked entities,
based on an entity granularity,
wherein the word granularity and entity granularity are
greater than a character granularity and the phrase
granularity is greater than the word granularity and the
entity granularity;
training the semantic representation model using the
training corpus set to cause it to learn a capability of
analyzing whether an initial letter of a word needs to be
capitalized in different contexts; and
training the semantic representation model using the
training corpus set to cause it to learn a capability of
predicting whether words in the training corpus set
occur in other segments of an original document,
wherein the training the semantic representation model
using the training corpus set based on grammar comprises at least one of the following:
training the semantic representation model using the
training corpus set to enable it to learn a capability of
recognizing an order relationship of different segments
of the training corpus; and
training the semantic representation model using the
training corpus set to enable it to learn a capability of
recognizing a positional relationship of any two sentence pairs,
wherein the training the semantic representation model
using the training corpus set based on semantics comprises at least one of the following:
training the semantic representation model using the
training corpus set to enable it to learn a capability of
recognizing a logic relationship between two continuous sentences; and training the semantic representation model using the training corpus set to enable it to learn a capability of recognizing correlation between a query and a webpage title in the training corpus.

4. The electronic device according to claim 3, wherein after training the semantic representation model using the training corpus set based on at least one of lexicon, grammar and semantics, the method further comprises:
training the semantic representation model based on a pre-collected task corpus set of natural language processing, to obtain a corresponding task model of natural language processing; and
executing the task of natural language processing, based on the task model of natural language processing.

5. A non-transitory computer-readable storage medium storing computer instructions therein, wherein the computer instructions are used to cause the computer to perform a method for processing a semantic representation model, the semantic representation model comprising a transformer as an encoder structure of a bottom layer, and a token embedding, a positional embedding, a sentence embedding and a task embedding being input to the bottom layer, wherein the task embedding is used to finely model different tasks, wherein the method comprises the following steps:
collecting a training corpus set including a plurality of training corpuses; and
training the semantic representation model using the training corpus set based on lexicon, grammar and semantics,
wherein the training the semantic representation model using the training corpus set based on lexicon comprises:
training the semantic representation model using the training corpus set based on a masking strategy of words, phrases and/or entities, comprising:
marking words, phrases and entities in training sentences obtained from the training corpus set;
training the semantic representation model using the obtained training sentences and the marked words, based on a word granularity;
training the semantic representation model using the obtained training sentences and the marked phrases, based on a phrase granularity; and
training the semantic representation model using the obtained training sentences and the marked entities, based on an entity granularity,
wherein the word granularity and entity granularity are greater than a character granularity and the phrase granularity is greater than the word granularity and the entity granularity;
training the semantic representation model using the training corpus set to cause it to learn a capability of analyzing whether an initial letter of a word needs to be capitalized in different contexts; and
training the semantic representation model using the training corpus set to cause it to learn a capability of predicting whether words in the training corpus set occur in other segments of an original document,
wherein the training the semantic representation model using the training corpus set based on grammar comprises at least one of the following:
training the semantic representation model using the training corpus set to enable it to learn a capability of recognizing an order relationship of different segments of the training corpus; and
training the semantic representation model using the training corpus set to enable it to learn a capability of recognizing a positional relationship of any two sentence pairs,
wherein the training the semantic representation model using the training corpus set based on semantics comprises at least one of the following:
training the semantic representation model using the training corpus set to enable it to learn a capability of recognizing a logic relationship between two continuous sentences; and
training the semantic representation model using the training corpus set to enable it to learn a capability of recognizing correlation between a query and a webpage title in the training corpus.

6. The non-transitory computer-readable storage medium according to claim 5, wherein after training the semantic representation model using the training corpus set based on at least one of lexicon, grammar and semantics, the method further comprises:
training the semantic representation model based on a pre-collected task corpus set of natural language processing, to obtain a corresponding task model of natural language processing; and
executing the task of natural language processing, based on the task model of natural language processing.

* * * * *